(No Model.)
H. F. BARTLETT.
OVEN FOR OIL, GAS, OR GASOLINE STOVES.
No. 478,211. Patented July 5, 1892.
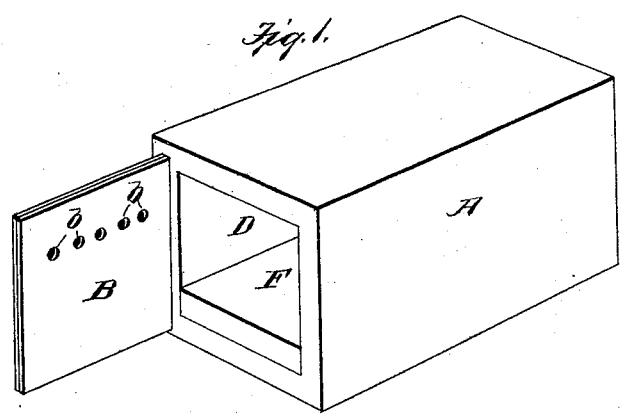
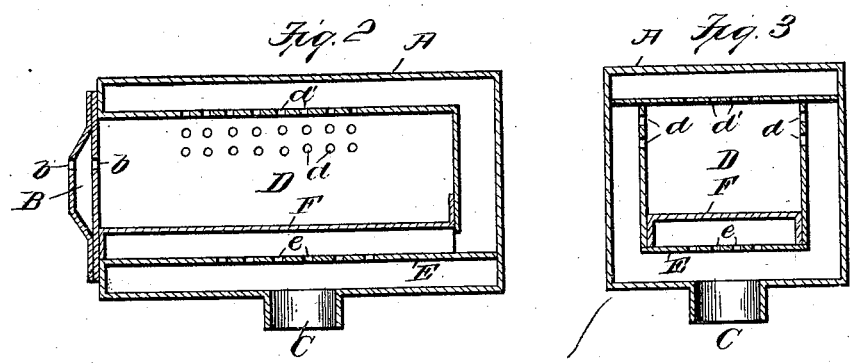
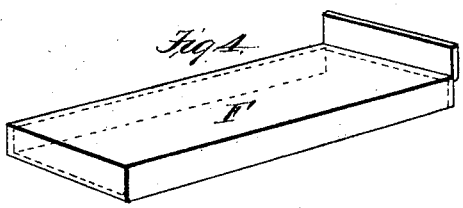
Witnesses:
F. P. Cornwall
Alex Scott
Inventor,
H. F. Bartlett
By L. S. Bacon
his Atty.

UNITED STATES PATENT OFFICE.

HENRY F. BARTLETT, OF SPRINGFIELD, MISSOURI, ASSIGNOR OF ONE-THIRD TO S. A. HAZLETINE, S. C. HAZLETINE, AND JOHN F. CARSON, OF SAME PLACE.

OVEN FOR OIL, GAS, OR GASOLINE STOVES.

SPECIFICATION forming part of Letters Patent No. 478,211, dated July 5, 1892.

Application filed April 28, 1887. Serial No. 236,502. (No model.)

*To all whom it may concern:*

Be it known that I, HENRY F. BARTLETT, a citizen of the United States, residing at Springfield, in the county of Greene and State of Missouri, have invented certain new and useful Improvements in Ovens for Oil, Gas, or Gasoline Stoves; and I do hereby declare the following to be a full, clear, and exact description of the invention, such as will enable others skilled in the art to which it appertains to make and use the same.

My invention relates to a new and useful improvement in ovens for oil-stoves; and it consists, generally stated, in an outer casing provided with an inlet heat-opening in its bottom, a perforated plate above said opening, an interior casing provided with an imperforate bottom, said casing being perforated in its sides and top, and a door provided with perforations, all as will hereinafter be described, and afterward pointed out in the claim.

In the drawings forming a part of this specification, wherein like letters of reference refer to like parts wherever they occur, Figure 1 is a perspective view of the oven. Fig. 2 is a longitudinal vertical section. Fig. 3 is a transverse vertical section, and Fig. 4 is a perspective of the removable bottom detached.

In the drawings, A represents the outer casing, provided with a door B at one end, said door being perforated, as at *b*.

C indicates a heat-inlet opening; D, an interior chamber provided with openings *d* and *d'* in its sides and top, respectively, the top extending laterally beyond the sides of the chamber to the sides of the casing A. At the bottom of the casing is a perforated plate E, extending the entire length thereof and of a width less than the casing, said bottom being provided with openings *e* immediately over the heat-inlet C.

F indicates a supplemental bottom or sliding floor fitting snugly in the bottom of the interior chamber, said bottom being provided with downwardly-projecting flanges at its front and sides to permit free passage of hot air between the same and the perforated bottom E. Extending upwardly from the rear of this supplemental bottom is a flange adapted to fit against the rear wall of the interior chamber and form a tight joint therewith.

The passage of the hot air entering the inlet C may be described as follows: Heated air enters the opening C and, impinging against the perforated bottom E, is diffused. A portion passing through the openings *e* comes in contact with the bottom F and passes beneath the same out at the rear of the interior chamber, while that portion of the heated air not finding passage through the openings *e* passes around the sides of the interior chamber upward, portions of which find passage through openings *d* in the sides of the interior chamber, and the balance, passing rearwardly, is again commingled with the hot air coming from beneath the bottom F, and thence the commingled air passes forwardly over the interior chamber and down into the chamber through the openings *d'* in the top thereof, from whence it passes through the openings in the door. It will thus be seen that hot air is continually circulating around and through the interior chamber in which the article to be cooked is placed and a uniform temperature is maintained on all sides, which is a very desirable feature in ovens of this class.

Having thus described my invention, what I claim as new, and desire to secure by Letters Patent, is—

In an oven for oil-stoves, the combination, with the outer casing having an inlet-opening in its bottom, of a perforated plate above said opening and an interior casing provided with a solid bottom, perforated sides and top, and a door provided with perforations near its upper edge for the escape of the air, substantially as and for the purposes described.

In testimony whereof I affix my signature in presence of two witnesses.

HENRY F. BARTLETT.

Witnesses:
H. H. HAMMOND,
BRYANT COKER.